United States Patent
Yeh

(10) Patent No.: US 11,658,581 B1
(45) Date of Patent: May 23, 2023

(54) POWER CONVERTER WITH ADJUSTABLE OUTPUT VOLTAGE

(71) Applicant: ACBEL POLYTECH INC., New Taipei (TW)

(72) Inventor: Chia-An Yeh, New Taipei (TW)

(73) Assignee: Acbel Polytech Inc., New Taipei (TW)

( * ) Notice: Subject to any disclaimer, the term of this patent is extended or adjusted under 35 U.S.C. 154(b) by 0 days.

(21) Appl. No.: 17/671,988

(22) Filed: Feb. 15, 2022

(51) Int. Cl.
*H02M 3/335* (2006.01)

(52) U.S. Cl.
CPC ... *H02M 3/33576* (2013.01); *H02M 3/33571* (2021.05); *H02M 3/33592* (2013.01)

(58) Field of Classification Search
CPC ......... H02M 3/33576; H02M 3/33571; H02M 3/33592; H02M 3/335
See application file for complete search history.

(56) References Cited

U.S. PATENT DOCUMENTS

| | | | | |
|---|---|---|---|---|
| 5,907,481 A * | 5/1999 | Svardsjo | ........... | H02M 3/33592 363/126 |
| 6,188,592 B1 * | 2/2001 | Farrington | ........ | H02M 3/33592 363/21.06 |
| 6,324,077 B1 * | 11/2001 | Lopresti | ............ | H02M 3/33592 363/16 |
| 8,693,213 B2 * | 4/2014 | Jungreis | .............. | H02M 1/4241 363/17 |
| 9,966,861 B1 * | 5/2018 | Yeh | .................... | H02M 3/33592 |
| 9,979,308 B1 * | 5/2018 | Meneses Herrera | ........ | H02M 3/33592 |
| 9,997,994 B1 * | 6/2018 | Luo | ................... | H02M 3/33546 |
| 10,666,154 B2 * | 5/2020 | Yao | .................... | H02M 3/33576 |
| 10,862,400 B2 * | 12/2020 | Nian | ................... | H02M 3/33538 |
| 11,349,401 B1 * | 5/2022 | Zafarana | ............... | H02M 1/342 |
| 11,362,593 B2 * | 6/2022 | Ouyang | ............ | H02M 3/33571 |
| 11,411,504 B1 * | 8/2022 | Peng | ................... | H02M 1/0054 |
| 2002/0110005 A1 * | 8/2002 | Mao | .................. | H02M 3/33592 363/21.06 |
| 2004/0109335 A1 * | 6/2004 | Gan | .................. | H02M 3/33592 363/127 |
| 2005/0040711 A1 * | 2/2005 | West | ................... | H02M 7/4807 361/18 |

(Continued)

FOREIGN PATENT DOCUMENTS

| | | |
|---|---|---|
| TW | 201220662 A | 5/2012 |
| TW | 201338385 A | 9/2013 |
| TW | M603233 U | 10/2020 |

*Primary Examiner* — Yusef A Ahmed
(74) *Attorney, Agent, or Firm* — Rosenberg, Klein & Lee

(57) ABSTRACT

A power converter with an adjustable output voltage has an isolation DC/DC transformer, a primary side circuit connected to a primary coil of the isolation DC/DC transformer for transmitting an input AC power to the primary coil, and a secondary side circuit connected to a secondary coil of the isolation DC/DC transformer. The secondary side circuit includes a first output loop, a second output loop and a mode switch connected in the first output loop. When power consumption of a load is low, the mode switch is turned off to interrupt the first output loop so that the secondary side circuit generates a first output voltage with a low voltage level. When power consumption of a load is high, the mode switch is turned on and the secondary side circuit generates a second output voltage with a high voltage level. Without greatly increasing circuits, the power converter achieves wide-range voltage regulation.

3 Claims, 11 Drawing Sheets

(56) References Cited

U.S. PATENT DOCUMENTS

| | | | |
|---|---|---|---|
| 2005/0243582 A1* | 11/2005 | Lee ................... | H01F 30/04 |
| | | | 363/50 |
| 2006/0139823 A1* | 6/2006 | Shoji ................. | H02M 1/34 |
| | | | 361/56 |
| 2009/0212758 A1* | 8/2009 | Asinovski ......... | H02M 3/33571 |
| | | | 323/355 |
| 2009/0290384 A1 | 11/2009 | Jungreis | |
| 2010/0052423 A1* | 3/2010 | Shimada ........... | H02M 3/33507 |
| | | | 363/20 |
| 2011/0090604 A1* | 4/2011 | Butler ............... | H02M 5/293 |
| | | | 327/427 |
| 2013/0162048 A1* | 6/2013 | Kim .................. | H02J 1/001 |
| | | | 307/82 |
| 2015/0098250 A1* | 4/2015 | Wu ................... | H02M 3/33507 |
| | | | 363/17 |
| 2015/0103562 A1* | 4/2015 | Yeh ................... | H02M 3/3353 |
| | | | 363/21.02 |
| 2015/0124492 A1* | 5/2015 | Fu .................... | H02M 3/33546 |
| | | | 363/21.02 |
| 2016/0190945 A1* | 6/2016 | Liu ................... | H02M 1/32 |
| | | | 363/21.02 |
| 2017/0087997 A1* | 3/2017 | Trunk ............... | H02M 1/32 |
| 2017/0104418 A1* | 4/2017 | Hsiao ................ | H02M 1/08 |
| 2018/0069485 A1* | 3/2018 | Hsiao ................ | H02M 3/285 |
| 2018/0309372 A1* | 10/2018 | Leong ............... | H02M 3/33546 |
| 2019/0068069 A1* | 2/2019 | Sheng ............... | H02M 3/01 |
| 2020/0083818 A1* | 3/2020 | Lin ................... | H02M 3/285 |
| 2020/0358355 A1* | 11/2020 | Zambetti ........... | H03K 17/693 |
| 2022/0385190 A1* | 12/2022 | Xu .................... | H02M 3/33576 |

\* cited by examiner

US 11,658,581 B1

POWER CONVERTER WITH ADJUSTABLE OUTPUT VOLTAGE

BACKGROUND OF THE INVENTION

1. Field of the Invention

The invention is related to a power converter, particularly to a power converter providing a wide-range voltage adjustment.

2. Description of the Related Art

An electronic product usually operates with a dedicated power converter that generates a specific output power needed by the electronic product. For providing different output powers to different electronic products, a great number of different power converters may be necessary, which is quite inconvenient for users.

To offer a wide-range output voltage adjustment by a single power converter, the power converter may use a plurality of modules to generate multiple output voltages of different levels respectively. With reference to FIG. 11, the power converter comprises multiple isolation direct-current to direct-current (DC/DC) converting modules 300, 400, wherein one of the DC/DC converting modules 400 provides a low output voltage and the other DC/DC module 300 provides a high output voltage.

When the power converter receives an alternate current (AC) power from an input port 100, a rectifying unit 200 of the power converter rectifies the AC power to a DC power for inputting to primary units of the DC/DC converting modules 300, 400. After the DC/DC converting modules 300, 400 respectively convert the DC power, the converted DC powers are output from secondary units of the DC/DC converting modules 300,400 to a high-power output port 500 and a low-power output port 600 respectively. The high-power output port 500 is for outputting a high power for electronic products with high power consumption demand, while the low-power output port 600 outputs a relatively low power for products with low power consumption demand.

Since the power converter shown in FIG. 11 is composed of multiple DC/DC converting modules 300, 400, the power converter is relatively bulky and inconvenient to carry.

Another type of power converter may use different topologies other than the DC/DC modules, but such power converter is unable to achieve the purpose of wide-range output voltage adjustment. According to specifications proposed by the USB Implementers Forum (USB IF), a suggested wide-range output voltage adjustment should be in the range of 5 to 48 volts, while the maximum output power should be 240 watts. Such a power converter only outputs a voltage in the relative narrow range of 5 to 20 volts.

SUMMARY OF THE INVENTION

An objective of the present invention is to provide a power converter with an adjustable output voltage to achieve the wide-range output voltage adjustment to meet different load demands without using multiple DC/DC converters connected in parallel.

To achieve the objective, the power converter includes an isolation DC/DC transformer having a primary coil and a secondary coil, a primary side circuit connected to the primary coil of the isolation DC/DC transformer for transmitting an input AC power to the primary coil, a secondary side circuit connected to the secondary coil of the isolation DC/DC transformer and comprising a first output loop and a second output loop, and a mode switch connected to the first output loop.

When the mode switch turns off, the first output loop is open and the second output loop outputs a first output voltage. When the mode switch turns on, the second output loop outputs a second output voltage higher than the first output voltage.

In the power converter, the mode switch is selectively turned on or off depending on load demand so that the secondary side circuit is able to output a voltage needed by the load. The power converter uses a single isolation DC/DC transformer, instead of multiple converters connected in parallel, to achieve the wide-range output voltage adjustment and minimize the size and weight as much as possible.

Other objectives, advantages and novel features of the invention will become more apparent from the following detailed description when taken in conjunction with the accompanying drawings.

DETAILED DESCRIPTION

Figure 1:
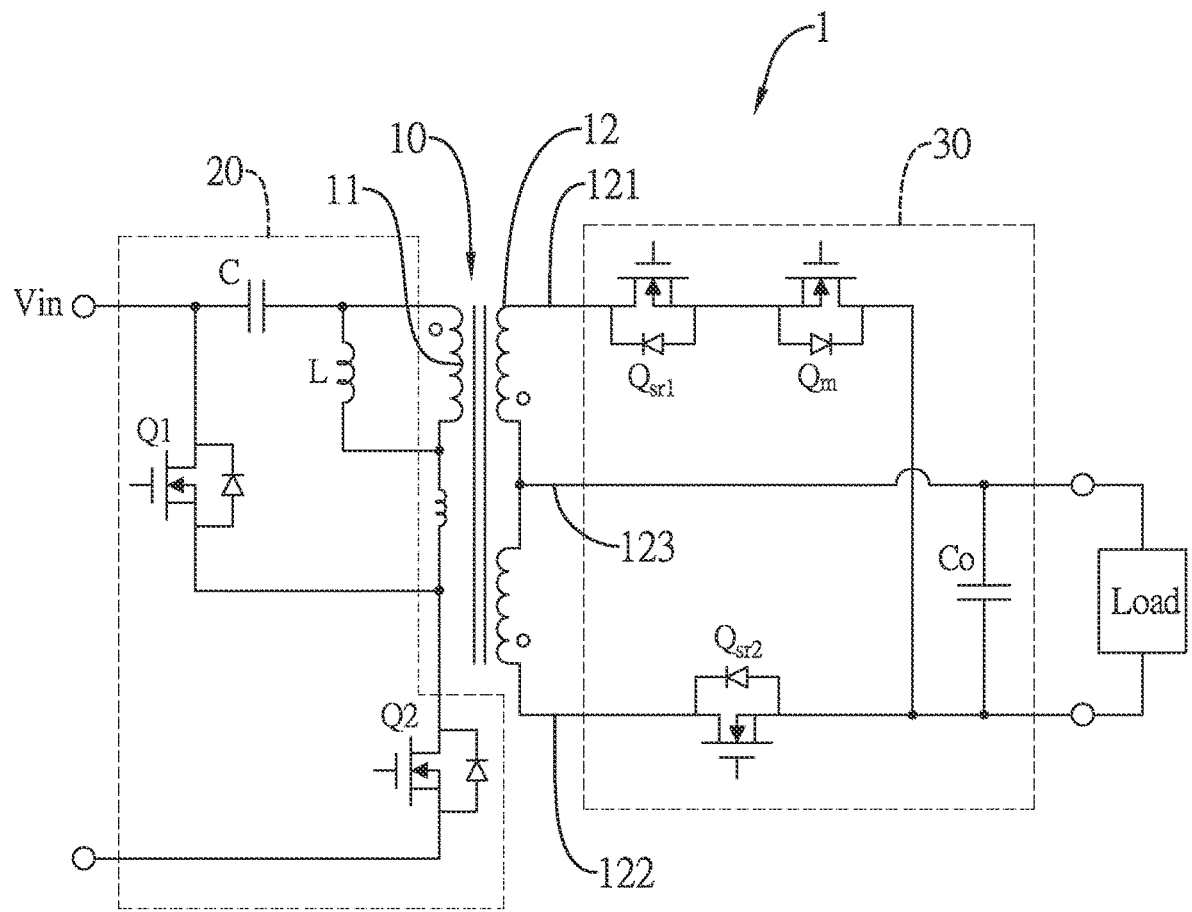
FIG. 1 is a circuit diagram of a power converter in accordance with a first embodiment of the present invention.

FIG. 1 is a circuit diagram of a power converter 1 in accordance with a first embodiment of the present invention. The power converter 1 includes an isolation direct-current to direct-current (DC/DC) transformer 10, a primary side circuit 20 and a secondary side circuit 30.

The DC/DC transformer 10 has a primary coil 11 and a secondary coil 12, wherein the secondary coil 12 in this embodiment is a central-tapped coil having a first end 121, a second end 122 and a central-tapped end 123.

The primary side circuit 20 is connected to the primary coil 11 and comprises an inductor L, a resonant capacitor C, a first switch Q1 and a second switch Q2. As an example, both the first switch Q1 and the second switch Q2 are NMOS power transistors. The inductor L is connected to the primary coil 11 in parallel. The resonant capacitor C is connected between an input port Vin and a dotted end of the primary coil 11, i.e. the end marked with a dot. The second switch Q2 is connected between the ground and a non-dotted end of the primary coil 11, i.e. the end without a dot. The first switch Q1 is connected between the input port Vin and the non-dotted end of the primary coil 11.

The secondary side circuit 30 is connected to the secondary coil 12 and comprises a first output loop and a second output loop, wherein a mode switch Qm is connected to the first output loop. In this embodiment, the secondary side circuit 30 has a first rectifying switch Qsr1 and a second rectifying switch Qsr2. The first rectifying switch Qsr1 is connected between the first end 121 of the secondary coil 12 and a first end of the mode switch Qm. A second end of the mode switch Qm is grounded. The first output loop in this embodiment is formed by connecting the secondary coil 12, the first rectifying switch Qsr1 and the mode switch Qm. The second output loop is formed by connecting the second rectifying switch Qsr2 between the second end 122 of the secondary coil 12 and the ground. The central-tapped end 123 is connected to an output capacitor Co through which an output voltage of the power converter 1 can be supplied to a load. Both the first rectifying switch Qsr1 and the mode switch Qm are NMOS power transistors, wherein source terminals of the two NMOS transistors are connected together.

Figure 10:
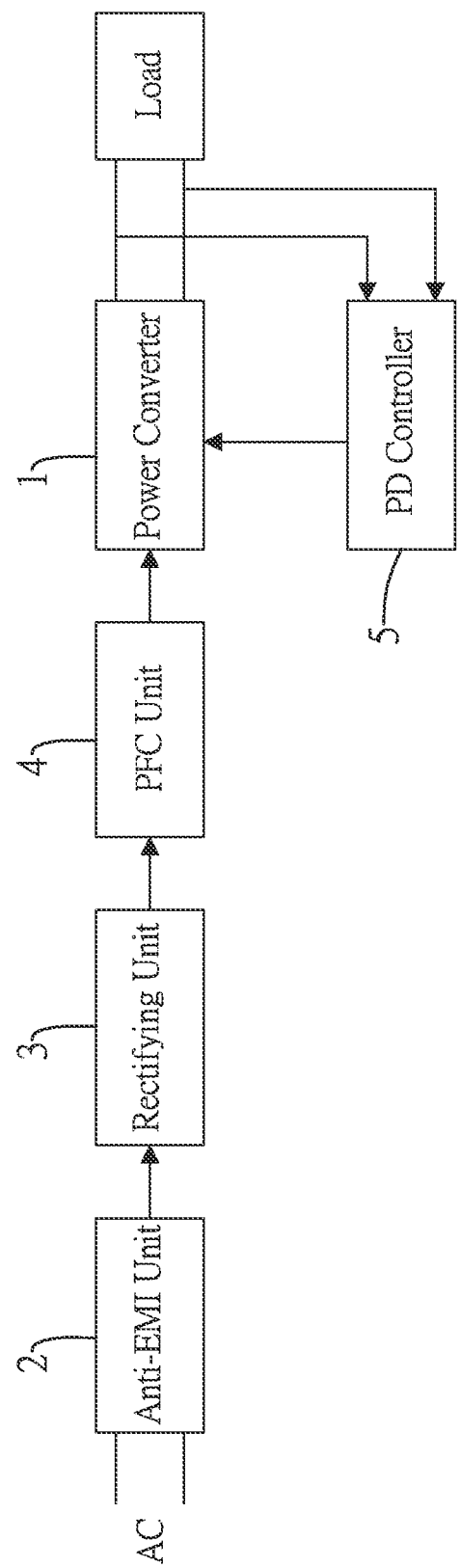
FIG. 10 is a circuit diagram of a power converter of the present invention being used in a power supply device.
Figure 11:
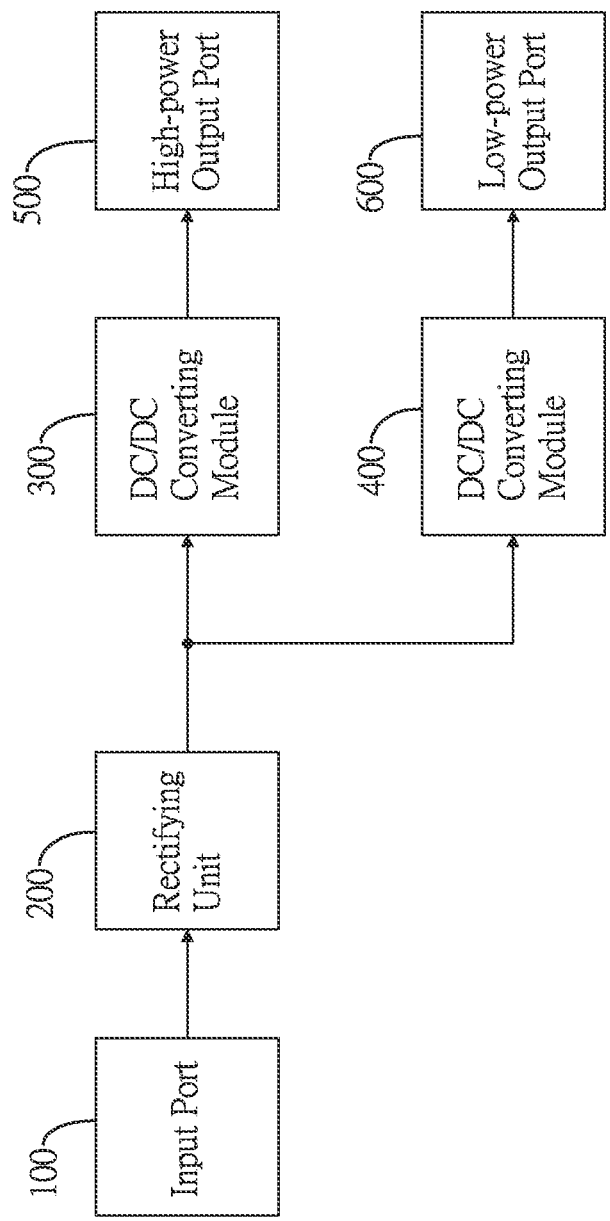
FIG. 11 is block diagram of a conventional power converter.

The power converter 1 of the present invention is selectively operated in either a first mode or a second mode depending on load demand, wherein the output voltage generated in the second mode is greater than the output voltage generated in the first mode. The first mode such as an asymmetric half-bridge flyback mode supplies the output voltage lower than 36 volts. The second mode such as a half-bridge LLC mode supplies the output voltage in a range of 36-48 volts. As shown in FIG. 10, a power distribution (PD) controller 5 is used with the power converter 1 to detect the load demand such as a power consumption of the load. When the load requires a low power, the power converter 1 is operated in the asymmetric half-bridge flyback mode. Otherwise, when the load requires a high power, the power converter is operated in the half-bridge LLC mode.

I. First Mode (Asymmetric Half-Bridge Flyback Mode)

Figure 2:
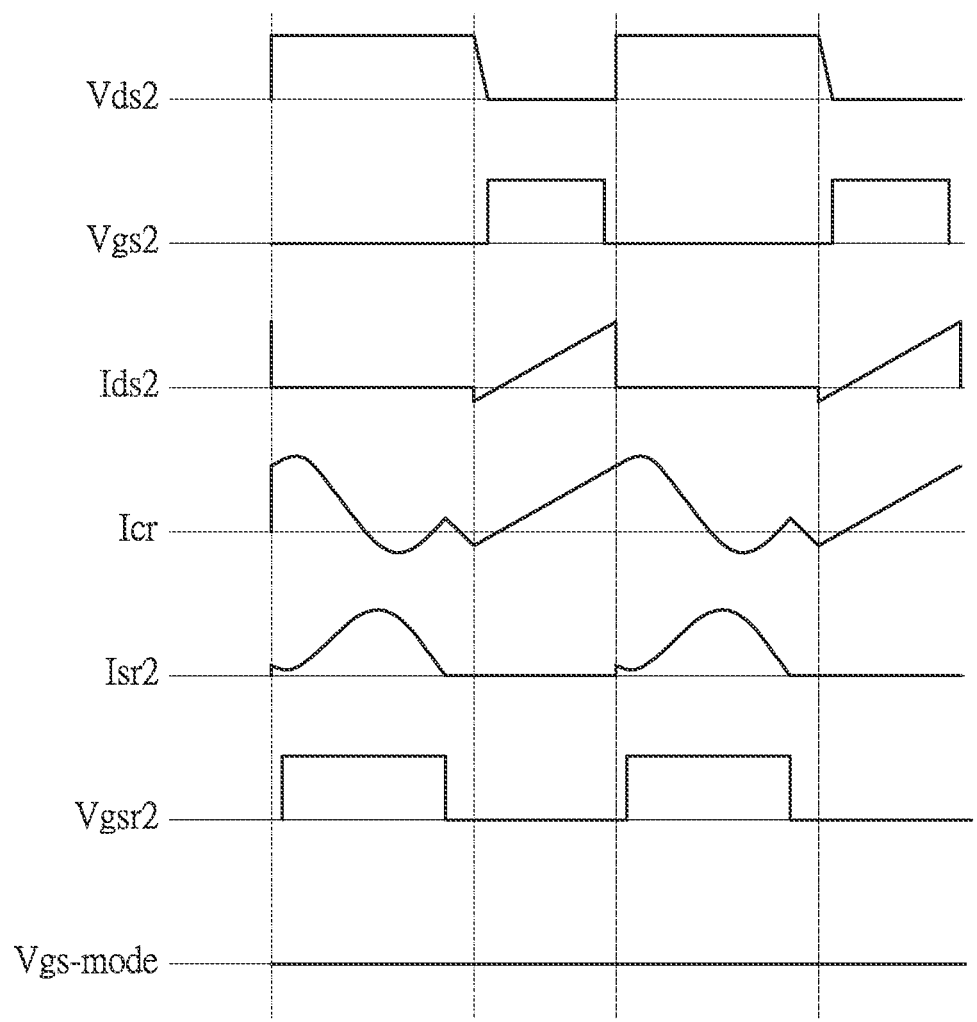
FIG. 2 illustrates waveforms of voltages and currents when the power converter is operated in the first mode.

With reference to FIG. 2, the multiple waveforms respectively illustrate:

Vds2: the voltage between drain and source of the second switch Q2;

Vgs2: the voltage between gate and source of the second switch Q2;

Ids2: the current flowing through the second switch Q2;

Icr: the current flowing through the resonant capacitor C;

Isr2: the current flowing through second rectifying switch Qsr2;

Vgsr2: the voltage between gate and source of the second rectifying switch Qsr2; and Vgs-mode: the voltage between gate and source of the mode switch Qm.

Figure 3A:
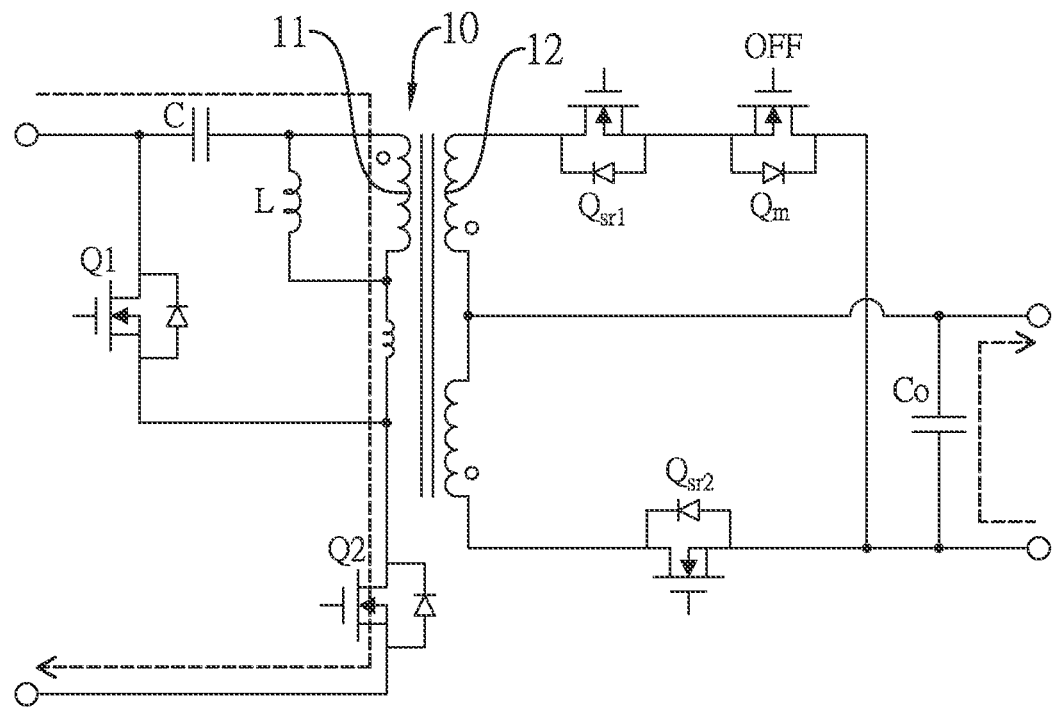
FIG. 3A illustrates an operational circuit diagram when a second switch Q2 is turned on and the power converter is operated in the first mode.
Figure 3B:
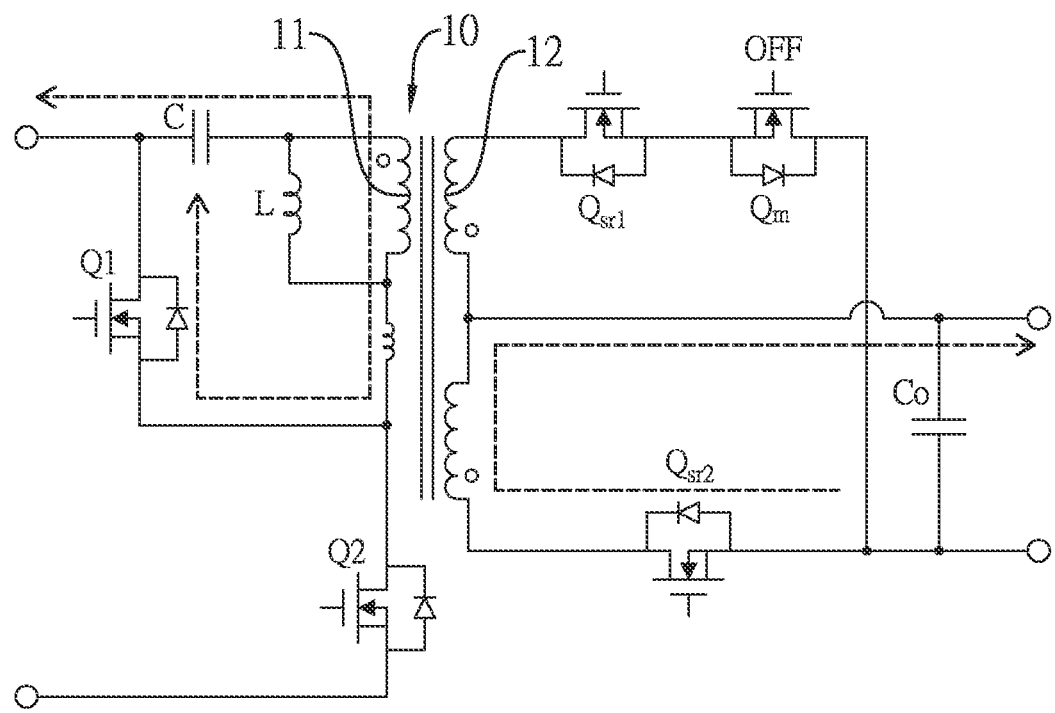
FIG. 3B illustrates an operational circuit diagram when a second switch Q2 is turned off and the power converter is operated in the first mode.

In the asymmetric half-bridge flyback mode, the mode switch Qm remains in the turned-off status so that the Vgs-mode in FIG. 2 keeps in a low voltage level. Since the mode switch Qm being turned off is equivalent to an open circuit, the first rectifying switch Qsr1 is invalid. FIG. 3A illustrates the operation of the power converter 1 in which the first switch Q1 is turned off, the second switch Q2 is turned on and the second rectifying switch Qsr2 is turned off, wherein the currents Icr and Ids2 gradually increase while the current Isr2 remains almost zero. FIG. 3B illustrates the operation of the power converter 1 in which the first switch Q1 is turned on, the second switch Q2 is turned off and the second rectifying switch Qsr2 is turned on, wherein the secondary side circuit 30 generates a current Isr2 of half wave.

II. Second Mode (Half-Bridge LLC Mode)

Figure 4:
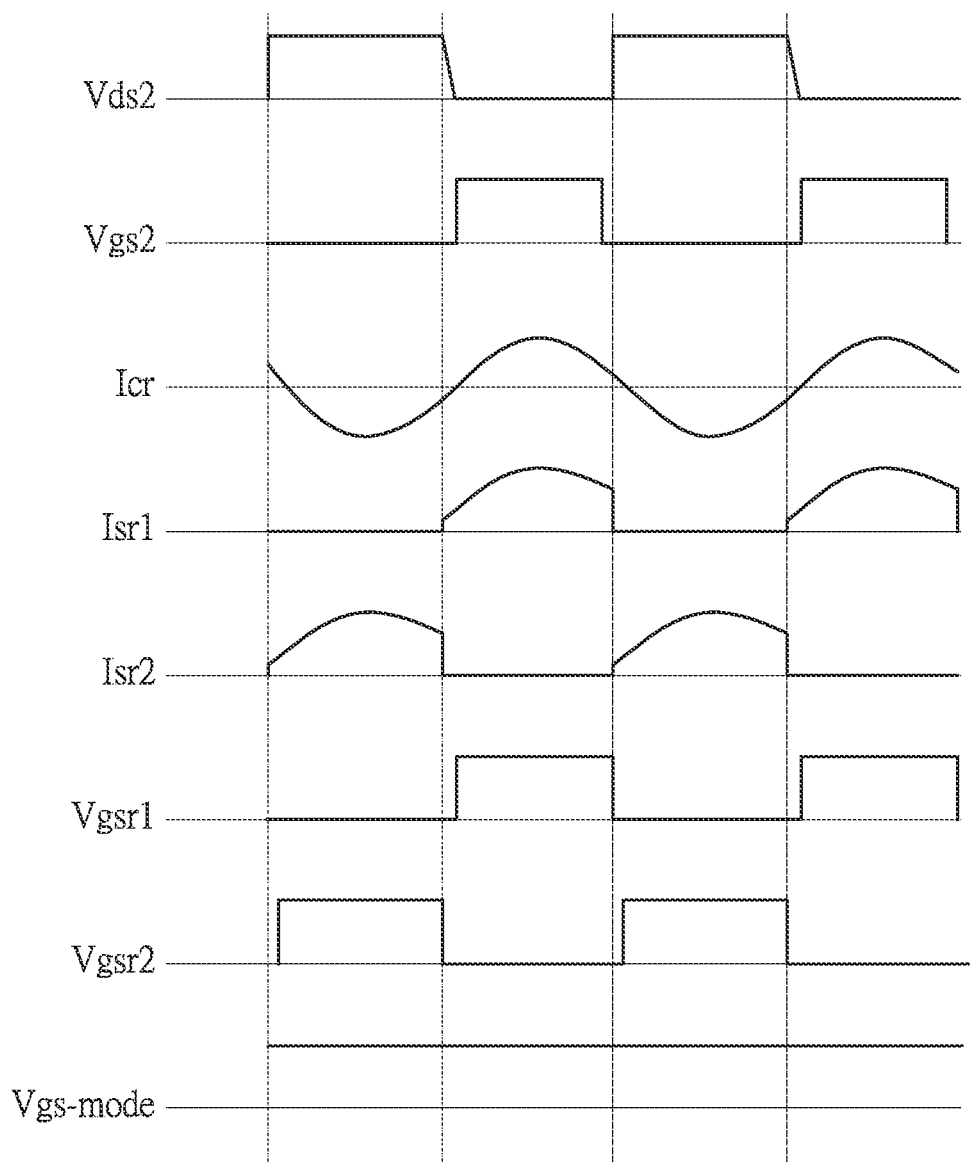
FIG. 4 illustrates waveforms of voltages and currents when the power converter is operated in the second mode.

With reference to FIG. 4, the multiple waveforms respectively illustrate:

Vds2: the voltage between drain and source of the second switch Q2;

Vgs2: the voltage between gate and source of the second switch Q2;

Icr: the current flowing through the resonant capacitor C;

Isr1: the current flowing through the first rectifying switch Qsr 1;

Isr2: the current flowing through the second rectifying switch Qsr 2;

Vgsr1: the voltage between gate and source of the first rectifying switch Qsr1;

Vgsr2: the voltage between gate and source of the second rectifying switch Qsr2; and Vgs-mode: the voltage between gate and source of the mode switch Qm.

Figure 5A:
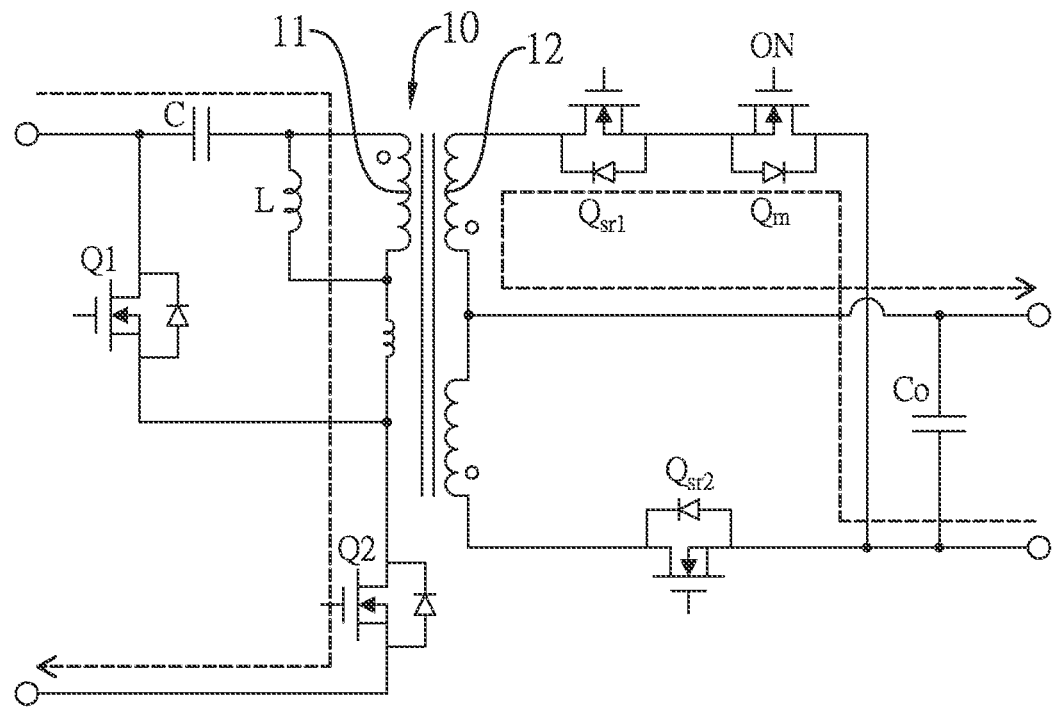
FIG. 5A illustrates an operational circuit diagram when a second switch Q2 is turned on and the power converter is operated in the second mode.
Figure 5B:
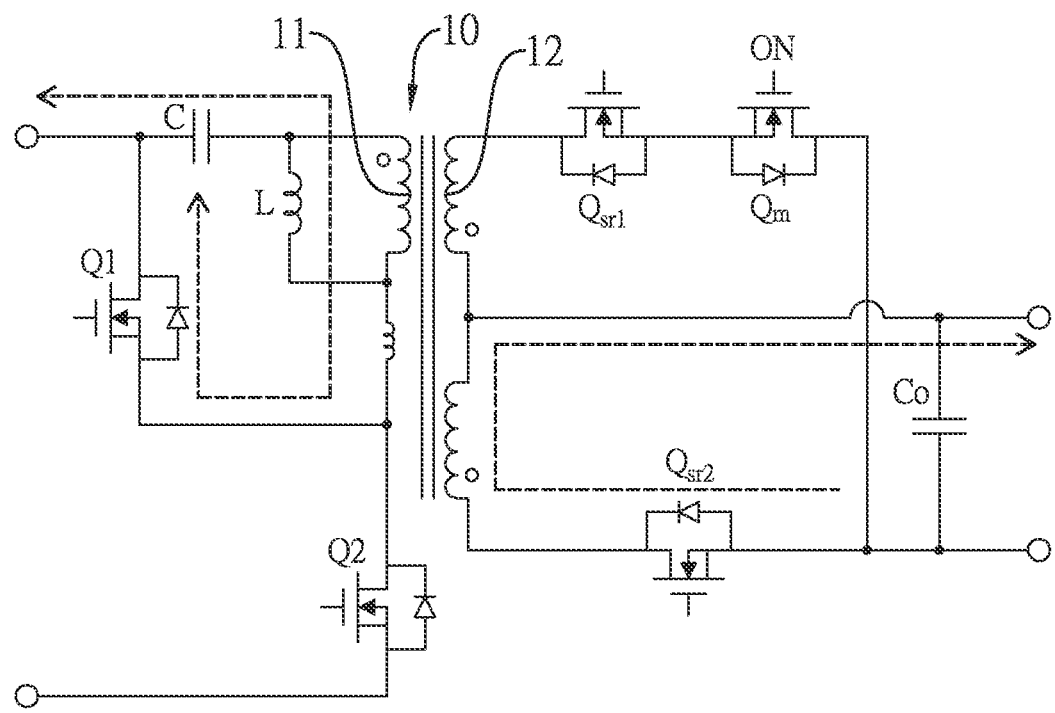
FIG. 5B illustrates an operational circuit diagram when a second switch Q2 is turned off and the power converter is operated in the second mode.

In the half-bridge LLC mode, the mode switch Qm remains in the turned-on status so that the Vgs-mode in FIG. 4 keeps in a high voltage level. FIG. 5A illustrates the operation of the power converter 1 in which the first switch Q1 is turned off, the second switch Q2 is turned on, the first rectifying switch Qsr1 is turned on and the second rectifying switch Qsr2 is turned off, wherein the current Isr1 flows through the first rectifying switch Qsr1 in the secondary side circuit 30. FIG. 5B illustrates the operation of the power converter 1 in which the first switch Q1 is turned on, the second switch Q2 is turned off, the first rectifying switch Qsr1 is turned off and the second rectifying switch Qsr2 is turned on, wherein the current Isr2 flows through the second rectifying switch Qsr2 in the secondary side circuit 30. Since the secondary side circuit 30 alternately outputs the currents Isr1 and Isr2 in different cycles, the power converter 1 operated in the second mode accordingly provides a power higher than the power in the first mode.

Figure 6:
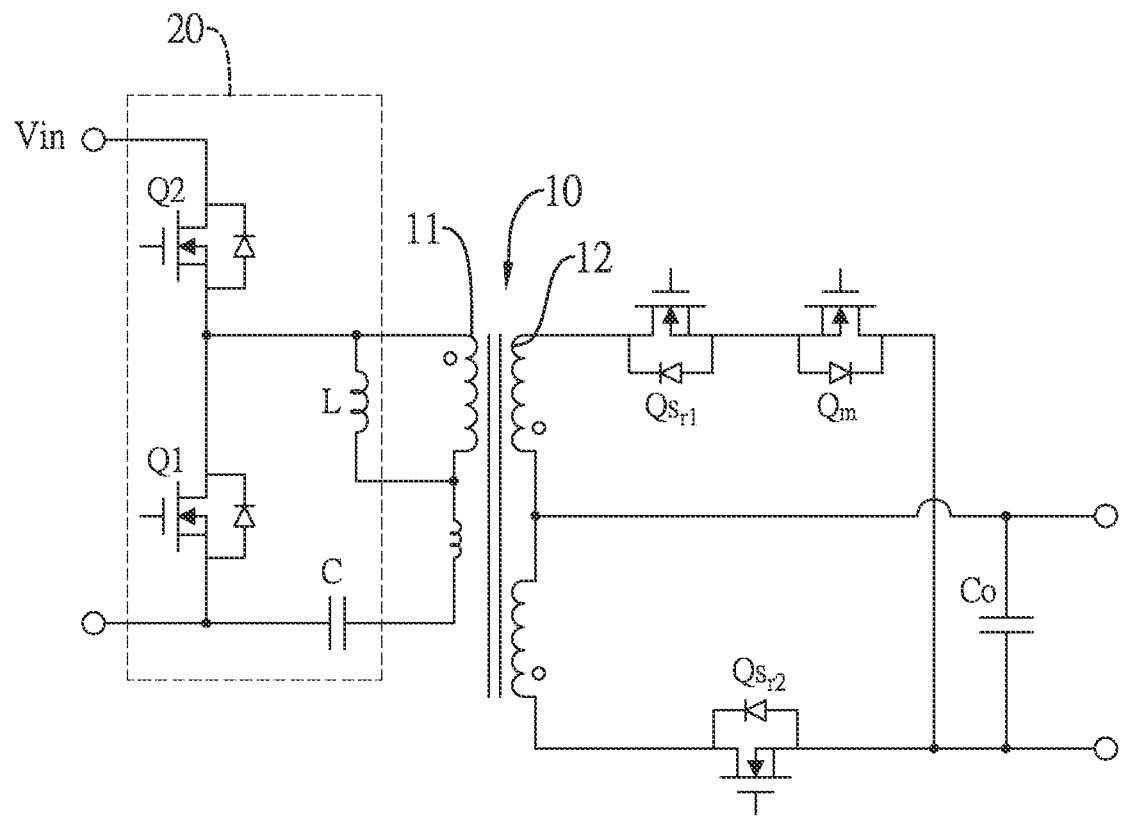
FIG. 6 is a circuit diagram of a power converter in accordance with a second embodiment of the present invention.

With reference to FIG. 6, the second embodiment differs from the first embodiment in the configuration of the primary side circuit 20. The primary side circuit 20 is connected to the primary coil 11 and comprises an inductor L, a resonant capacitor C, a first switch Q1 and a second switch Q2. The inductor L is connected to the primary coil 11 in parallel. The resonant capacitor C is connected between the non-dotted end of the primary coil 11 and the ground. The first switch Q1 is connected between the dotted end of the primary coil 11 and the ground. The second switch Q2 is connected between the input port Vin and the dotted end of the primary coil 11.

Figure 7:
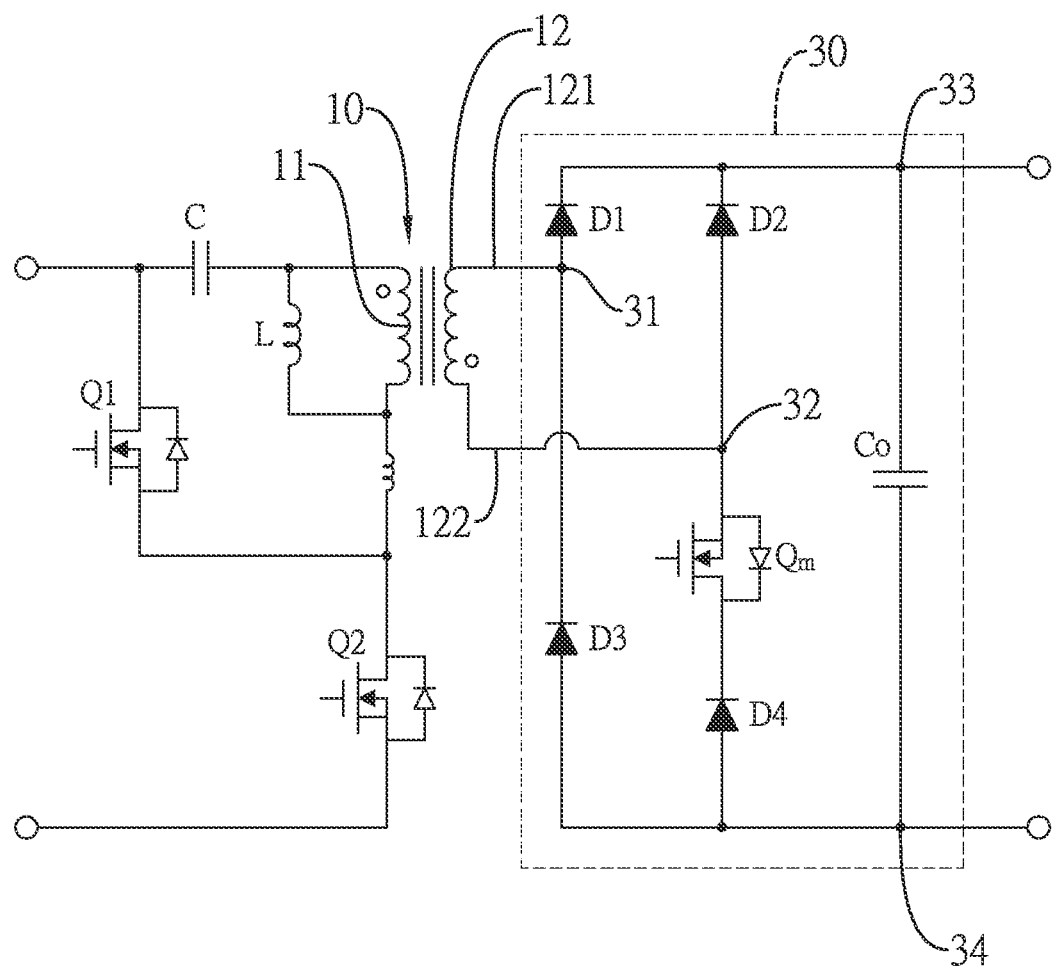
FIG. 7 is a circuit diagram of a power converter in accordance with a third embodiment of the present invention.

With reference to FIG. 7, the third embodiment differs from the first embodiment in the secondary coil 12 of the DC/DC transformer 10, wherein the secondary coil 12 is not a central-tapped coil. The secondary coil 12 has a first end 121 and a second end 122. Further, the secondary side circuit 30 is a full bridge rectifying circuit having a first diode D1, a second diode D2, a third diode D3, a fourth diode D4, two input terminals 31, 32 and two output terminals 33, 34.

The two input terminals 31, 32 of the full bridge rectifying circuit are respectively connected to the first end 121 and the second end 122 of the secondary coil 12. The two output terminals 33, 34 are respectively connected with the two ends of the output capacitor Co. The connection of the secondary coil 12, the first diode D1, the output capacitor Co and the fourth diode D4 form the first output loop, wherein the mode switch Qm is connected in series with the fourth diode D4. The connection of the secondary coil 12, the second diode D2, the output capacitor Co and the third diode D3 form the second output loop. When the mode switch Qm remains in the turn-on status, the full bridge rectifying circuit performs a full wave rectifying function so that the power converter 1 operates in the second mode. When the mode switch Qm is turned off, the first output loop becomes an open circuit, and the full bridge circuit performs a half wave rectifying function so that the power converter 1 operates in the first mode.

Figure 8:
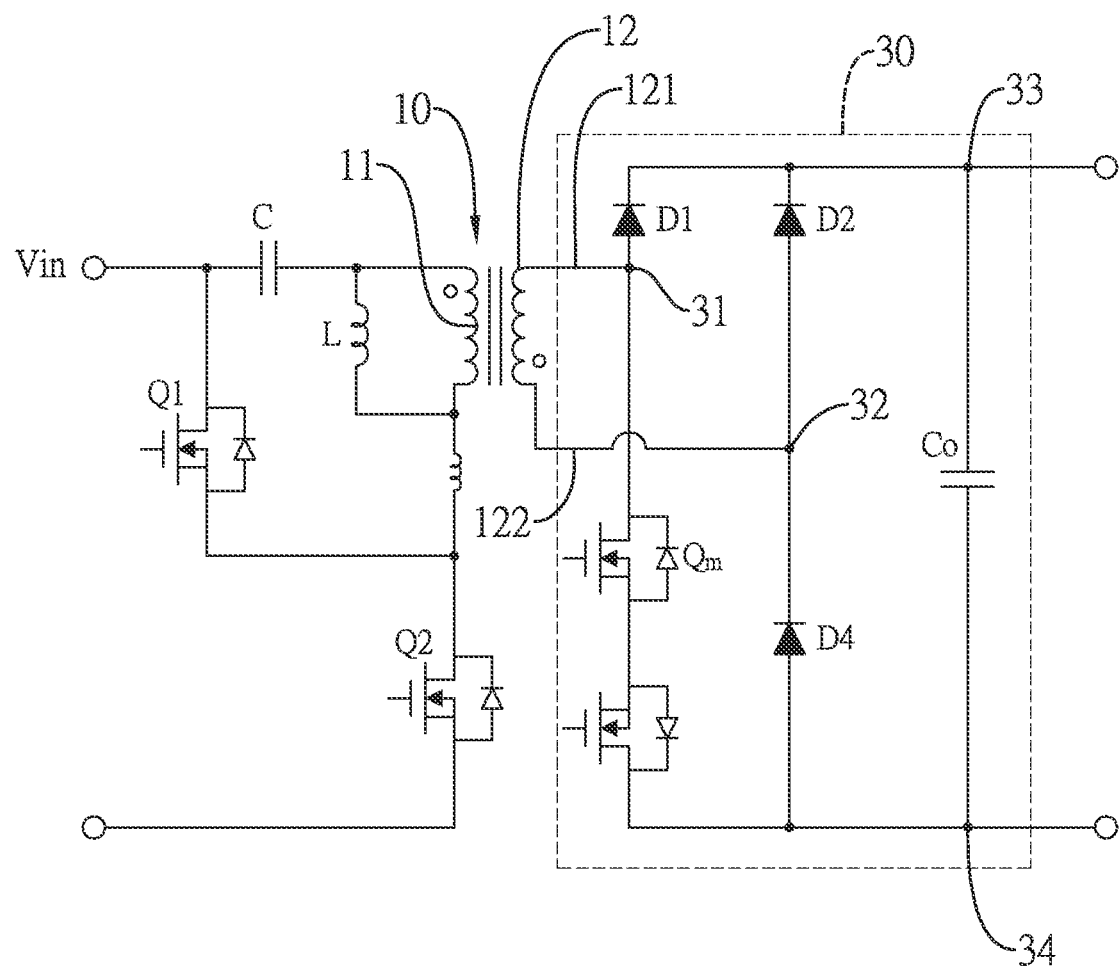
FIG. 8 is a circuit diagram of a power converter in accordance with a fourth embodiment of the present invention.

With reference to the fourth embodiment in FIG. 8, in comparison to FIG. 7, one or more diodes D1-D4 of the full bridge rectifying circuit is replaced by one or more power transistors. As shown in FIG. 8, the original third diode D3 is replaced by a power transistor connected in series to the mode switch Qm.

Figure 9:
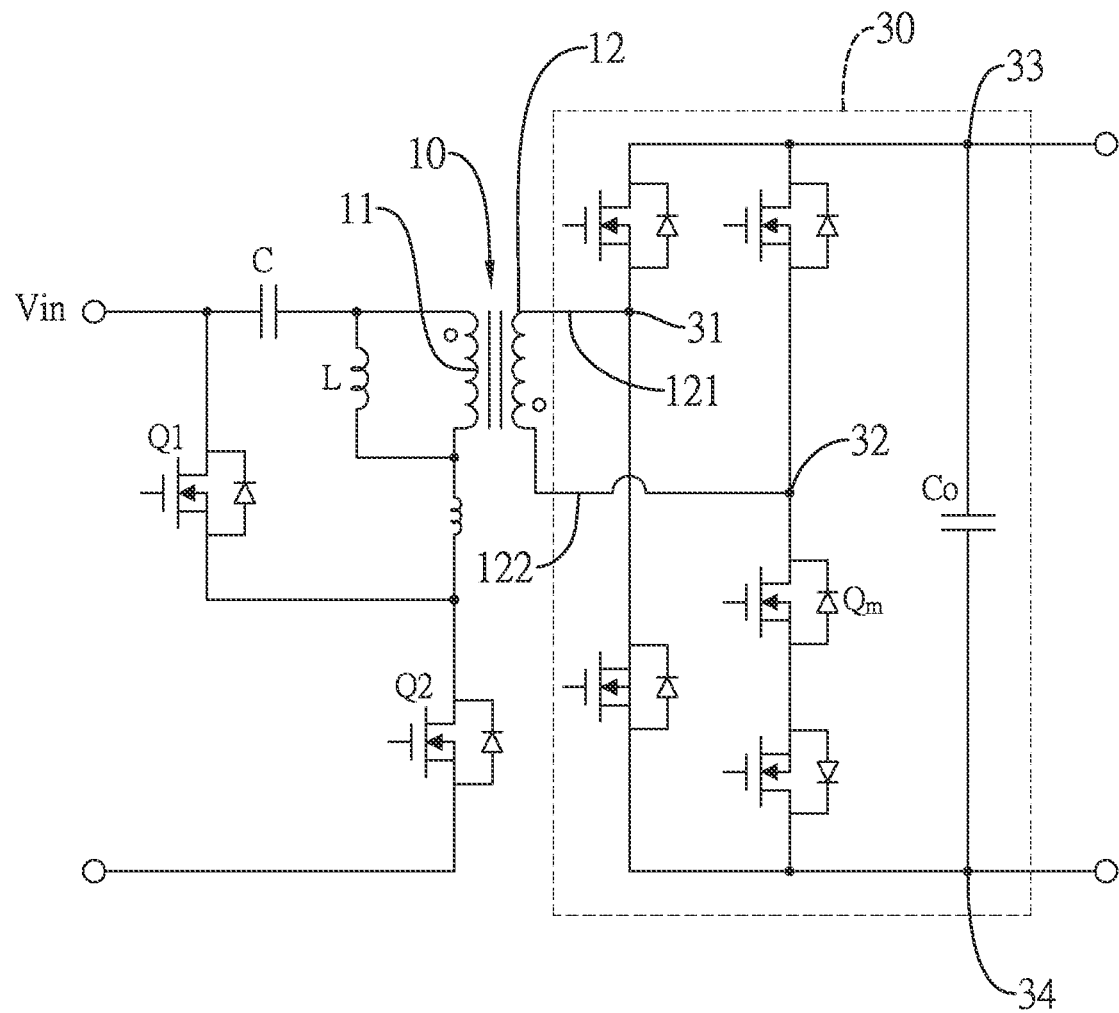
FIG. 9 is a circuit diagram of a power converter in accordance with a fifth embodiment of the present invention.

With reference to the fifth embodiment in FIG. 9, the original diodes D1-D4 in FIG. 7 are all replaced by the power transistors, wherein the mode switch Qm can be connected in series to any one of the power transistors.

With reference to FIG. 10, the power converter 1 of the present invention is applied to a power supply device such as a power adapter for charging an electronic product. The power supply device further includes an anti-electromagnetic interference (EMI) unit 2, a rectifying unit 3 and a power factor correcting unit 4. An AC power is input through the anti-EMI unit 2 and then processed by the rectifying unit 3 and the power factor correcting unit 4 for providing to the power converter 1.

When the PD controller 5 determines that the load requires a high charging power, the power distribution controller 5 outputs control signals to the power converter 1 to respectively turn on or turn off the first switch Q1, the second switch Q2, the mode switch Qm, the first rectifying switch Qsr1 and the second rectifying switch Qsr2 in such a way that the power converter 1 operates in the half-bridge LLC mode to supply a high charging power. When the power distribution controller 5 determines that the load requires a low charging power, the PD controller 5 outputs control signals to the power converter 1 for controlling the power converter 1 to be operated in the asymmetric half-bridge flyback mode and output the low charging power to the load.

Instead of using multiple DC/DC converters connected in parallel, the power converter 1 of the present invention can be operated in different modes by controlling the mode switch Qm to meet different load demands. With the relatively simple circuit configuration, the power converter achieves the wide-range output voltage adjustment, for example 5-48 volts, and also reduces the size of the power converter such that it is more suitable to be applied in a portable charger.

Even though numerous characteristics and advantages of the present invention have been set forth in the foregoing description, together with details of the structure and function of the invention, the invention is illustrative only. Changes may be made in detail, especially in matters of shape, size, and arrangement of parts within the principles of the invention to the full extent indicated by the broad general meaning of the terms in which the appended claims are expressed.

What is claimed is:

1. A power converter with an adjustable voltage output, comprising:
    an isolation DC/DC transformer having a primary coil and a secondary coil;
    a primary side circuit connected to the primary coil of the isolation DC/DC transformer for transmitting an input AC power to the primary coil;
    a secondary side circuit connected to the secondary coil of the isolation DC/DC transformer and comprising a first output loop and a second output loop;
    a mode switch connected to the first output loop;
    wherein when the mode switch turns off, the first output loop is open and the second output loop outputs a first output voltage; when the mode switch turns on, the second output loop outputs a second output voltage higher than the first output voltage;
    wherein the secondary coil is a central-tapped coil having a first end, a second end and a central-tapped end;
    the secondary side circuit includes a first rectifying switch and a second rectifying switch, wherein the first output loop is formed by a configuration that the first rectifying switch is connected to the first end of the secondary coil and connected to one end of the mode switch, while the other end of the mode switch is connected to a ground;
    the second output loop is formed by a configuration that the second rectifying switch is connected between the second end of the secondary coil and the ground;
    the central-tapped end of the secondary coil is connected to an output capacitor;
    the first rectifying switch and the mode switch are NMOS power transistors with their sources connected together; and
    the primary side circuit comprises:
    an inductor connected in parallel to the primary coil;
    a resonant capacitor connected between an input DC power port of an input DC power and a dotted end of the primary coil;
    a first switch having
        a first end connected to the input DC power port of the input DC power; and
        a second end connected to a non-dotted end of the primary coil; and
    a second switch connected between the non-dotted end of the primary coil and the ground.

2. The power converter as claimed in claim 1, wherein when the mode switch turns off, the power converter is operated in a first mode that is an asymmetric half-bridge flyback mode and the first output voltage is lower than 36 volts; and
    when the mode switch turns on, the power converter is operated in a second mode that is a half-bridge LLC mode and the second output voltage is in a range of 36 to 48 volts.

3. The power converter as claimed in claim 1, wherein the mode switch is connected to a power distribution controller that outputs a signal to control the mode switch based on a charging requirement of a load.

* * * * *